P. C. ABBOTT.
HANDLE FOR CROSSCUT SAWS.
APPLICATION FILED JUNE 26, 1920.
1,392,898.
Patented Oct. 11, 1921.
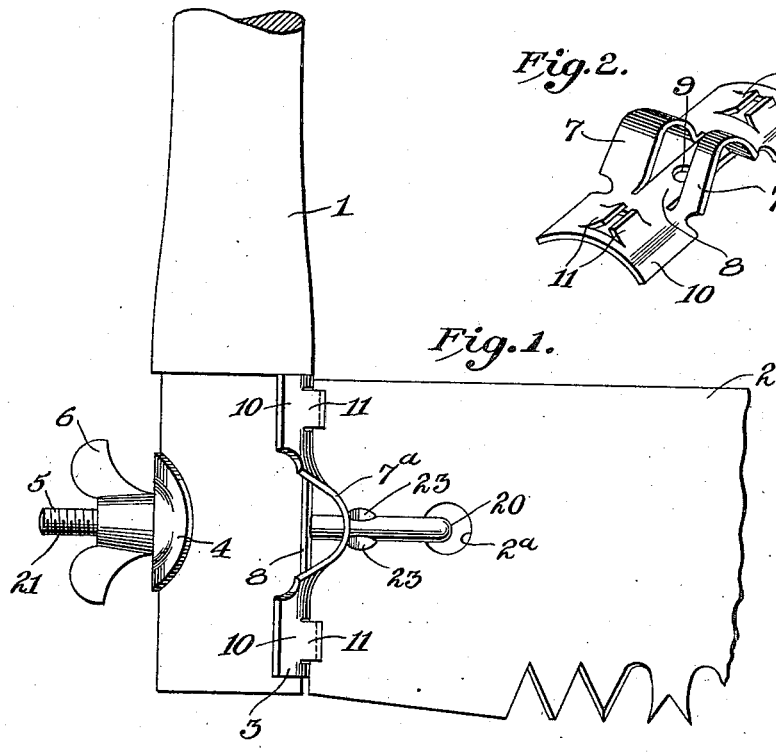
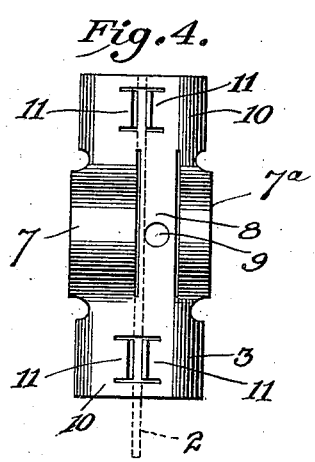
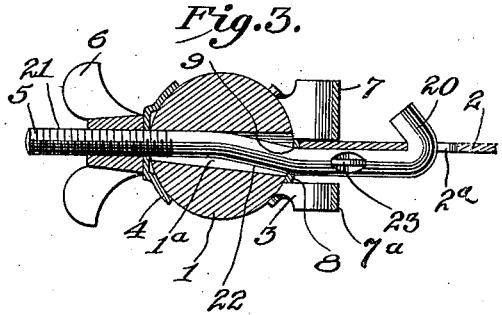
Inventor
Percy C. Abbott
By Mason Fenwick & Lawrence,
Attorneys

UNITED STATES PATENT OFFICE.

PERCY C. ABBOTT, OF RICHMOND, VIRGINIA.

HANDLE FOR CROSSCUT-SAWS.

1,392,898.  Specification of Letters Patent.  Patented Oct. 11, 1921.

Application filed June 26, 1920. Serial No. 391,974.

*To all whom it may concern:*

Be it known that I, PERCY C. ABBOTT, citizen of the United States, residing at Richmond, in the county of Henrico and State of Virginia, have invented certain new and useful Improvements in Handles for Crosscut-Saws; and I do hereby declare the following to be a full, clear, and exact description of the invention, such as will enable others skilled in the art to which it appertains to make and use the same.

This invention relates to handles for cross cut saws and more particularly to the butt plate against which the butt end of the saw rests when drawn against it by means of the usual clamping bolt.

In the patent to Dillard 951,104 is disclosed a type of butt plate for cross cut saws with respect to which the present invention is an improvement. In the said Dillard patent a plate with curved ends is seated against a saw handle at one end and is provided with a substantially V-shaped or arched boss formed by stamping up the metal crosswise of the plate. The said V-shaped boss is slotted longitudinally to provide for the passage of the saw blade and one or both of the separated side portions of said boss is or are cut away to provide for the passage of a clamping bolt having a hooked end to engage an orifice in a saw blade.

In my improvement two V-shaped or arched bosses are struck up transversely of the plate but a straight strip of metal is left between them extending between the curved end portions and fitting snugly on the handle. The intermediate straight strip is perforated to receive a clamping bolt and said clamping bolt is provided with a stop on its shank so that when the saw and handle are not connected the plate will be held loosely assembled with the handle and insured against loss by engagement of the stop on the bolt with the plate, the stop being large enough to prevent its passage through the hole in the plate.

It will be observed that in the construction disclosed in the Dillard patent, when the saw is removed from the handle the hooked end of the bolt may pass through the notches in the V-shaped boss and there is nothing to prevent detachment of the butt plate; that the saw blade rests upon the ends of the plate and bridges across a space between; that there is nothing to brace the plate against tending to bend at the transverse fold occasioned by the bent up "bosses."

In my construction the plate does not fall away from the handle when the latter is detached from the saw; the saw butt has a metallic seat throughout the length of the plate, and the straight intermediate strip between the arched bosses coöperates with the latter to secure superior stiffness and strength.

In the accompanying drawings in which similar reference characters designate corresponding parts throughout the several views:

Figure 1 is a side elevation of a portion of a handle and a portion of a saw blade secured to it by means of this invention;

Fig. 2 is a perspective of the improved butt plate;

Fig. 3 is a cross section through the handle and butt plate;

Fig. 4 is a plan view of the butt plate.

The usual handle of a cross cut saw is indicated by the numeral 1. At one end of the handle 1 are the fastening devices whereby one butt end of a cross cut saw blade 2 may be secured to the handle. The butt plate 3 is shaped to fit the curvature of the end of a handle and upon the opposite side of the handle from the butt plate is the customary perforated plate or washer 4 through which and through a hole 1ª in the handle and a hole in the butt plate a bolt 5 extends, having one end 20 engaging the saw blade 2 and the other threaded end 21 engaged by a nut 6 whereby the bolt may be drawn through the handle in order to seat the saw blade butt firmly against the butt plate.

The butt plate 3 is composed of sheet steel, or other suitable metal, formed in a draw or stamping press. Between the ends of the plate two arched bosses 7 and 7ª rise from the surface of the plate leaving a strip of straight metal 8 flush and continuous with the end portions of said plate. The end portions 10 are curved so as to fit the curvature of the handle and the end portions 10 and strip 8 lie snugly against the handle. The boss or part 7 is of considerably greater width than the boss or part 7ª;

and the straight portion 8 lying between said arched bosses is perforated at 9 for the passage of the bolt.

A pair of lugs or lips 11 are struck up from the plate at each end and the lips 11 of each pair are spaced apart a distance which is substantially equal to the thickness of a saw blade. The arrangement of the lips or lugs 11 with respect to the inner sides of the boss 7 is such that when the saw blade is seated in the slots or groove between the lips 11 it will be in contact with the inner side of the member 7.

The clamping bolt 5 is provided with a hooked end 20 which is adapted to engage in a hole 2ª near one end of the saw blade 2. The opposite end of the bolt 5 is threaded at 21, as is usual, to receive the said nut 6. As illustrated the shank of the bolt 5 may be offset somewhat, as shown at 22, and the hole through the handle is of greater diameter than the diameter of the wire of which the bolt is made. Said bolt 5 is provided with stop lugs 23 which project from the sides of the bolt between the offset portion 22 and the hook 20 preferably in a plane which is at right angles to the plane of said hook 20. The lugs 23 may be conveniently swaged on the bolt and they must be of such a size as to prevent their passage through the orifice 9 in the central strip 8 of the butt plate and should not be placed so as to contact with the saw blade. By means of the stop lugs 23 the butt plate is prevented from separating from the handle when said handle is detached from the saw, and this is decidedly a feature of practical value.

When the handle is brought against the butt end of the saw blade the back of the bolt 5 or the side that is opposite the hook 20 rests against the inner edge of the bent up boss 7ª. By turning up the nut 6 the said bolt 5 will be drawn through the handle and the inner edge of the orifice 2ª in the saw blade will engage firmly in the reëntrant angle formed between the hook 20 and the shank of the bolt 5. The saw blade will then be firmly drawn against its seat on the butt plate, be held between the bolt and the side of the boss 7 and steadied by the grooves formed between lips or lugs 11. By the construction shown the saw blade may be detached from the handle without entirely unscrewing the nut 6 and the butt plate 3 will be prevented from separating entirely from the handle by the engagement of the lugs 23 with the plate, thus the annoyance of loss or misplacement of the plate is prevented.

By this improved construction a butt plate of the generic type shown in said patent is strengthened longitudinally; has a firmer seat on the saw handle; may be released from the saw without entirely unscrewing the nut 6, and the handle cast aside without any danger that the parts will separate from the handle and become lost.

Having thus described my invention in the form now best known to me, what I claim and desire to secure by Letters Patent of the United States is as follows:

1. In a saw handle, a butt plate having parallel arched bosses between its ends extending longitudinally of the plate and an intermediate strip flush with the surface of the plate, said intermediate strip having a perforation for the passage of a bolt adapted to confine the saw blade between the inner side of one of said arched portions and said bolt.

2. In a saw handle, a butt plate having parallel arched bosses between its ends one of which is wider that the other, a strip between said arched bosses connecting the ends of the plate and flush therewith, said strip having a bolt hole whereby a saw blade may be secured between a bolt passing through said bolt hole and the inner side of the wider arched boss.

3. In a saw handle, the combination of a butt plate having parallel arched bosses, a strip intervening between said arched bosses connecting the ends of the plate and flush therewith, said strip having a bolt hole, a saw clamping bolt passing through the bolt hole, said clamping bolt having a straight saw engaging face and an adjacent stop to prevent the passage of the plate thereover.

4. In a saw handle, the combination of a butt plate having two parallel arched bosses between its ends separated by a straight strip connecting the two end portions of said plate and flush therewith, one of said plates being wider than the other, said strip having a bolt hole therethrough, a bolt having an offset shank and a hooked end.

In testimony whereof I affix my signature.

PERCY C. ABBOTT.